United States Patent
Fretter et al.

(10) Patent No.: US 11,568,745 B2
(45) Date of Patent: Jan. 31, 2023

(54) METHOD FOR DETERMINING AN OCCUPANCY STATUS OF A PARKING BAY AND FOR DETERMINING THE OCCUPANCY STATUSES OF SEVERAL PARKING BAYS ALONG A STREET

(71) Applicant: Parkling GmbH, Berlin (DE)

(72) Inventors: Christoph Fretter, Berlin (DE); Mark Hashimoto, Berlin (DE); Detlev Huelsebusch, Berlin (DE); Oleg Selig, Berlin (DE)

(73) Assignee: Parkling GmbH, Berlin (DE)

( * ) Notice: Subject to any disclaimer, the term of this patent is extended or adjusted under 35 U.S.C. 154(b) by 28 days.

(21) Appl. No.: 17/322,152

(22) Filed: May 17, 2021

(65) Prior Publication Data
US 2021/0390855 A1   Dec. 16, 2021

(30) Foreign Application Priority Data
Jun. 12, 2020 (EP) .................................... 20179719

(51) Int. Cl.
*G08G 1/14* (2006.01)
*G01S 17/931* (2020.01)
*G01S 17/08* (2006.01)

(52) U.S. Cl.
CPC .............. *G08G 1/141* (2013.01); *G01S 17/08* (2013.01); *G01S 17/931* (2020.01); *G08G 1/147* (2013.01)

(58) Field of Classification Search
CPC ........ G08G 1/141; G08G 1/147; G01S 17/08; G01S 17/931; G01S 7/4808; G01S 17/86;
(Continued)

(56) References Cited

U.S. PATENT DOCUMENTS

2011/0022269 A1   1/2011  Nakazono et al.
2021/0074158 A1*  3/2021  Gruteser ............... G06V 20/586

FOREIGN PATENT DOCUMENTS

DE   102016212505 A1   1/2018
DE   102018214510 A1   3/2019
(Continued)

OTHER PUBLICATIONS

European Search Report for corresponding European Patent Application No. EP 20179719.8 dated Sep. 16, 2020 (in German).
(Continued)

*Primary Examiner* — Daryl C Pope
(74) *Attorney, Agent, or Firm* — Harness, Dickey & Pierce, P.L.C.

(57) ABSTRACT

The invention relates to a method for determining an occupancy status of a parking bay, wherein a vehicle is moved along a street segment with at least one parking bay and the vehicle has a distance sensor as well as a sensor for satellite-based location and time determination. Furthermore, static parking information on the position of the parking bays in a street segment and parking information on the parking bays are on hand. By means of distance and location data projected distance data are produced which each indicate a distance datum of the distance sensor to the next object in the sensor direction at a point of the street of the street segment at the parking bay. By means of these projected distance data a standard distance is ascertained. Subsequently, for each point of a parking bay the determination is made if this is unoccupied by comparing the distance datum with the standard distance plus a delta. An area of a parking bay is determined as one or several vacant parking spaces if the rounded-down quotient of the length of the adjoining contiguous unoccupied points to the length of an average parking space is 1 or greater.

16 Claims, 2 Drawing Sheets

(58) Field of Classification Search
CPC ............. G01S 15/08; G01S 2013/9314; G01S 2013/93274; G01S 2015/935; G01S 13/08; G06V 20/586
See application file for complete search history.

(56) References Cited

FOREIGN PATENT DOCUMENTS

| | | |
|---|---|---|
| DE | 102018107510 B3 | 7/2019 |
| EP | 2963631 A1 | 1/2016 |
| WO | WO-2016200883 A1 | 12/2016 |

OTHER PUBLICATIONS

Ono S. et al. "A probe car for parking-vehicle detection by using laser range sensor", Intelligent Vehicle Symposium, 2002, IEEE Jun. 17-21, 2002, Piscataway, JN, USA, IEEE, Bd. 2, Jun. 17, 2002, Seiten 322-327, XP010635848, ISBN: 978-0-7803-7346-4.

Mohottala S. et al. "Fusion of a camera and a laser range sensor for vehicle recognition", Computer Vision and Pattern Recognition Workshops, 2009, CVPR Workshops 2009. IEEE Computer Society Conference On, IEEE, Piscataway, NJ, Jun. 20, 2009, Seiten 16-23, XP031606891, Isbn: 978-1-4244-3994-2.

* cited by examiner

METHOD FOR DETERMINING AN OCCUPANCY STATUS OF A PARKING BAY AND FOR DETERMINING THE OCCUPANCY STATUSES OF SEVERAL PARKING BAYS ALONG A STREET

CROSS REFERENCE TO RELATED APPLICATIONS

This application claims priority to European Patent Application No. 20 179 719.8, filed Jun. 12, 2020. The entire disclosure of the above application is incorporated herein by reference.

TECHNICAL FIELD

The invention relates to a method for determining an occupancy status of a parking bay, in which a vehicle is moved along a street segment with at least one parking bay. The vehicle has a distance sensor aligned laterally to the curbside and a sensor for satellite-based location and time determination. By means of these two sensors at least distance and location data are recorded during movement of the vehicle along the street segment. The distance data of the distance sensor represent the distance of the distance sensor to the next object in the sensor direction. In other words, the distance data of the distance sensor define the distance between the vehicle and, for example, a vehicle parked laterally thereto or a house wall.

Furthermore, the invention relates to a method for determining occupancy statuses of several parking bays along a street segment.

BACKGROUND

As a result of the population growth in urban regions traffic is increasing, in particular also the individual traffic in passenger cars. Especially in inner-city areas, this massive increase in traffic density leads to problems which cause a shortage of space that can no longer be solved by simple means. Further problems are the concomitant noise pollution through increased vehicle traffic but also the exposure to contaminants which, in the meantime, is being increasingly regarded with concern.

Studies have shown that approximately 30% of inner-city traffic is not classical transportation traffic, but can be ascribed to vehicles being driven in search of a parking space.

Projections for Germany reveal that 1.9 billion hours are spent on searching out parking spaces. For this, 3.2 billion liters of fuel are consumed. All in all, an economic loss in the amount of 40.4 billion Euro is assumed.

Therefore, the call for a parking space management that reduces this excessive vehicle traffic in search of a parking space makes its presence felt to an increasing extent.

In the case of such systems a basic distinction is made between two states of data ascertainment. On the one hand, static data would have to be obtained, which indicate not only where parking spaces are located and at which times parking in these parking spaces is permitted, but which also provide information as to how the parking spaces are to be parked in, e.g., as lengthways or cross-wise parking. This also includes information about no-parking zones as well as possible parking fees. Such data are referred to as static data and constitute the fundamental prerequisite for a parking space management.

However, these data are insufficient to offer an active, efficient parking space management. For this, so-called dynamic data are additionally required. These represent information, on the basis of which a current parking space occupancy situation can be ascertained.

The ascertainment of such static data is described in DE 10 2018 214 510 A1 or DE 10 2016 212 505 A1 for example. The ascertainment of dynamic data or their prediction is known from DE 10 2018 107 510 B3 or WO 2016/200883 A1 for example.

However, particularly when ascertaining dynamic parking data, the known methods lead to the problems that these are either inaccurate or require a high level of investment, e.g., when provision is made for firmly installed sensors for parking spaces.

SUMMARY

The invention is therefore based on the object to provide a method for determining an occupancy status of a parking bay which can be carried out efficiently and is of high accuracy.

In accordance with the invention this object is achieved by methods having the features of one or more of the appended claims.

Advantageous embodiments of the invention are stated in the subclaims, the description as well as the Figures and their explanation.

According to the invention, provision is made in that static parking information on the position of parking bays in a street segment and parking information on each parking bay are on hand. For example, these can be ascertained as described in the European patent application 20 174 906.6 not yet published. Furthermore, by means of the distance and location data, projected distance data arranged along the parking bay, in particular on the street, are ascertained which each indicate a distance datum of the distance sensor to the next object in the sensor direction at a point on the street segment or the street at the parking bay. Thereby the projected distance data take into account a course of the street segment by projecting the location data on the course of the street segment and adjusting the distance data accordingly. By means of the projected distance data of the parking bay a standard distance is ascertained. Subsequently, a point of the parking bay is determined as unoccupied if the distance datum of this point is greater than the standard distance plus a delta. Then, an area of a parking bay can be determined as one or several vacant parking spaces if the rounded-down quotient of the length of the adjoining contiguous unoccupied points to the length of an average parking space is 1 or greater.

The invention is based on the realization that for a reliable determination of the occupancy status of a parking bay, it is not sufficient to just pass by the parking bay with a sensor, provided on a vehicle, for example, and ascertain an occupancy status by means of the data thus ascertained.

Within the framework of the invention a parking bay is considered as a part of a street or a parking option, in which parking spaces arranged in sequence are present. This means that these parking spaces exist without any interruption such as a driveway or the like. Within the meaning of the invention a street segment can furthermore be understood, for example, as the section of a street that extends between two junctions.

To correct the inaccuracy of existing methods, according to the method pursuant to the invention use is made of static parking information data on the position of parking bays in the street segment and parking information on each parking bay. Basically, static parking information are data that have to be ascertained separately by means of other methods. Examples for these data are not only the precise position of a parking bay, but also parking information of a parking bay, for example if this is a parking area, in which parking is allowed in parallel, perpendicularly or diagonally to the course of the street. Also included can be information of parking signs which, for example, only permit parking during the weekend.

On the basis of the ascertained distance and location data of the sensors, which are present in or on the vehicle and can be synchronized with each other, projected distance data are then calculated that are arranged along a parking bay to be assessed. These distance data indicate, for several points on the street parallel to the parking bay, at which distance the next object is present in the sensor direction. In this manner the projected distance data is able to consider the course of the street segment by projecting the location data on the course of the street segment and adjusting the distance data accordingly. So as an example, if the vehicle comprising the sensors did not move on the street in a straight way but drove serpentine lines due to the usage of the projected distance data, this movement can be compensated. As sensor direction can be understood in this case, e.g., the direction, in which the sensor is aligned. Ideally, this direction is orthogonal to the actual course of the street. Thus, the distance to the next object can be ascertained in the viewing direction of the sensor. This can, for example, be a parked car or, if no car is parked in the parking space, it can also be the house wall lying behind.

Another realization underlying the invention is that from the distance data, in the case of the invention from the projected distance data, only information for each individual parking bay can be ascertained and not general information. Moreover, according to the invention the realization was made that for a highly accurate evaluation it is necessary that a reference value, according to the invention referred to as standard distance, is explicitly recalculated for each parking bay and that, where possible, no standard value is used for the entire evaluation. The standard distance can be considered as the distance the vehicle or the sensor has to the street-facing side of a vehicle parked in the parking bay. Due to the fact that several vehicles can also be parked in a parking bay, this distance varies so that the standard distance according to the invention represents a corresponding mean value.

Subsequently, the projected distance data are evaluated such that a point of a parking bay is determined as unoccupied if the distance datum of this point is greater than the previously ascertained standard distance plus a delta. In order to now draw a conclusion as to vacant or occupied parking spaces, an evaluation is carried out. By this evaluation, an area of a parking bay is determined as one or several adjoining vacant parking spaces if the rounded-down quotient of the length of the adjoining contiguous unoccupied points to the length of an average parking space is 1 or greater. The length of an average parking space may result from the parking information, for example. In other words, calculation by way of the following equation is made:

$$n = \left\lfloor \frac{s_f}{s_a} \right\rfloor$$

wherein $s_f$ is the length of the adjoining contiguous unoccupied points, $s_a$ the length of an average parking space and n the number of contiguous parking spaces.

By analogy, conclusions as to the occupancy of a parking space can, of course, also be drawn by determining a point of a parking bay as occupied if the distance datum of this point is smaller than the standard distance plus the delta. Here, delta can represent a corresponding, in particular a positive correction value.

It is preferred if the projected distance data are ascertained equidistantly along the parking bay. In other words, this ensures that the projected distance data are on hand with the same density over the entire parking bay in order to carry out a reliable assessment.

To produce the projected distance data it may be advantageous if data of the street course of the street segment are present and these are used to produce the projected distance data. In other words, by using the synchronized location data the ascertained distance data can be projected, i.e., mapped onto data on the course of the street segment. In this way, the course of curves of a street segment can be compensated so that a highly accurate evaluation is rendered possible.

Furthermore, provision is made in that missing distance and/or location data can be interpolated for the projected distance data. For example, if provision is made in that along a parking bay, projected distance data are produced every 5 cm, it may be necessary, depending on the frequency of the ascertained data, to produce projected distance data through interpolation, as explained in greater detail in the following.

If it is assumed, for example, that the maximum speed of a vehicle in an urban area amounts to approximately 50 km/h and the scanning rate of the distance sensor is 200 Hz, a measurement would be carried out approximately every 7 cm. Insofar, an interpolation between the measured values is necessary. However, due to the fact that the average speed of 50 km/h is only reached in the rarest of cases, and the employed distance sensor also operates at a considerably higher scanning rate, e.g., in the range of 500 Hz, more than enough high-precision values are available for projected distance data.

This is similar in respect of the parallel and synchronously recorded location data. If, for example, a GPS system or a system operating according to the Galileo, Glonass and/or Beidou standard or a combination of such systems is used, these often have a scanning frequency in the range of 10 Hz. With an assumed speed of 50 km/h, this means a scanning value approximately every 110 cm. However, a linear movement between these two scanning points can be assumed so that the distance values of the distance sensor can accordingly be converted in a highly precise manner into projected distance data. Synchronization between the location data and the distance data can, for example, take place by way of a corresponding time synchronization in that a time stamp is present in both recorded signals.

As already explained, it is essential for the invention that a standard distance is ascertained for each parking bay. This can be carried out in various ways. One possibility is to use a distance histogram of the values of the projected distances along the parking bay. For this, all values of the projected distance data along a parking bay are entered into a histogram so that this shows that there are, e.g., 10 values with a distance of 105 cm, 300 values with a distance of 120 cm, and 4 values with a distance of 140 cm. In order to now determine the standard distance from this distance histogram, for example, the first maximum can be determined and defined as a "standard" distance.

The standard distance is rendered even more precise if the first maximum having a distance value of at least 1 meter is chosen.

This choice is based on the realization that in most cases, a distance greater than 1 meter exists between a vehicle passing by and parked vehicles. Therefore, a maximum lying considerably below 1 meter is mostly an erroneous measurement that should be disregarded.

Accuracy can be improved further in that as standard distance a first maximum of the distance histogram is used which amounts to at least 10% of the size of the highest maximum. This specification is also based on the realization that with this choice, measurement errors can be filtered out particularly well. Therefore, the standard distance which is essential for the determination of the parking state can be ascertained with accuracy.

Another possibility also offering improvement is that if as the standard distance, the first maximum of the distance histogram is used which has at least 10% of the surface of the distance histogram. In this way, the accomplishment is made in that the chosen maximum is not just a punctiform maximum but a maximum designed large enough to be substantial, i.e., to be taken into consideration.

As a matter of course, the different criteria described for determining the maximum can also be used by combining single ones or all of these criteria.

However, given that despite the above-described rule to determine the standard distance situations may arise, in which this cannot be determined reliably or satisfactorily, provision can be made in this case for the standard distance to be set to 5 meters. It has proved that in the unlikely event that no distinct standard distance can be ascertained by means of the projected distance data, the estimate of 5 meters for the standard distance still permits the ascertainment of the parking information with high accuracy. This is in particular the case if a parking bay is not occupied at all and is thus completely empty.

To determine if a parking space is vacant or how many vacant parking spaces exist in a parking bay the average length of a parking space is used. Similarly, the delta is employed to increase the standard distance. Both the length of an average parking space and the delta can result individually or in combination from the parking information of the respective parking bay. For the average length of a parking space it is essential that the parking situation is taken into account, i.e., if parking in this parking space is allowed in parallel, orthogonally or diagonally to the street or to the course of the street. For instance, as average length of a parking space, 5.5 meters are assumed in the case of parallel parking, 2.5 meters in the case of orthogonal parking and 3 meters in the case of diagonal parking.

Similarly, it is absolutely necessary to also adapt the delta according to the parking situation or the parking space orientation so that the ascertained information if a parking space is vacant or not is of sufficient accuracy. For example, values of 3 meters for parallel parking, 4 meters for orthogonal parking and 3.5 meters for diagonal parking lend themselves to this end. In other words, by way of the reference value produced by adding the standard distance and the delta, a fictitious distance is ascertained that would lie approximately in the center of a parked car so that a reliable and relatively error-free statement can be made as to whether a parking space is occupied or not.

As a distance sensor, various sensors including ultrasonic sensors and radar sensors may be used, as well as laser sensors, and in particular LIDAR sensors. Particularly cost-efficient is a 1D LIDAR sensor that is sufficient to determine the single distance between the sensor itself and the next object, for instance the bumper of a parked car.

It is advantageous if the distance and location data are forwarded to a remotely arranged computer unit, if, in particular in the latter, a storage is provided, in which the static parking information is present and if the computer unit carries out the calculation of the projected distance data, the standard distance and the determination of the parking state. In this way, a central architecture can be on hand in which the current distance and location data are ascertained by a vehicle with the appropriate sensors and transmitted to a control center. In the control center, based on the location and distance data, the correct static parking space information is retrieved for the respective parking bay and the previously described evaluation is carried out. In this way, the information about the parking situation of a parking bay is present in a central place. This information can then be forwarded to a parking guidance system that provides persons in search of a parking space with information on the current status of potential parking spaces in an area. For this purpose, several vehicles can also be deployed simultaneously to ascertain the distance and location data with only one control center.

Furthermore, the invention relates to a method for determining the occupancy statuses of several parking bays along a street segment. Provision is made in that the method, as described previously, is carried out individually and separately for each parking bay. In other words, a vehicle with the correspondingly necessary sensors can move along a street segment and thereby record the data. In doing so, however, it travels past several parking bays. In the subsequent evaluation the method according to the invention is carried out individually for each parking bay and not in one piece for the entire street segment. This is necessary because the standard distance essentially only permits a reliable assessment for one relevant parking bay.

In accordance with the invention it is possible, for example, to provide a corresponding sensor device with a GPS and a LIDAR sensor on a taxi or an Uber vehicle that moves relatively frequently in the city. During travel of the taxi the corresponding data can be ascertained automatically and forwarded to a control center. In the control center the method according to the invention is carried out, thereby enabling an evaluation as to where parking spaces are vacant. This information can then be passed on to persons in search of a parking space. As a result, inner-city traffic is reduced since a targeted finding of a parking space is rendered possible.

BRIEF DESCRIPTION OF DRAWINGS

The invention is explained in greater detail hereinafter by way of schematic exemplary embodiments with reference to the Figures, wherein.

DETAILED DESCRIPTION

Figure 1:
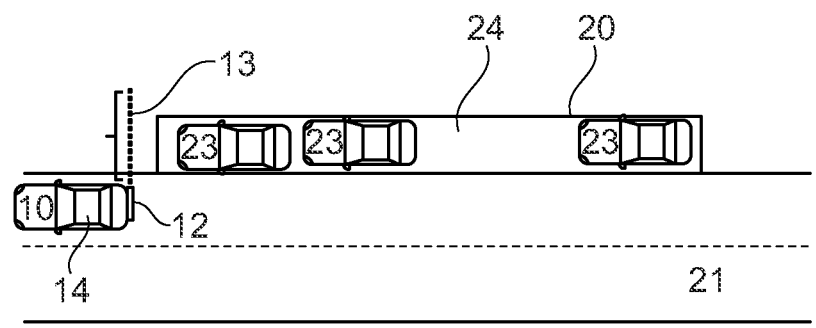
FIG. 1 is a schematic view of the situation when ascertaining distance and location data.

In the following the method according to the invention is explained in greater detail with reference to FIGS. 1 to 4.

As a first step according to the method pursuant of the invention a vehicle 10 equipped with a sensor device 12, which can be a 1D LIDAR sensor for example, and a GPS sensor 14. The vehicle 10 travels along a street segment in which at least one parking bay 20 is present. Within the meaning of the invention, a parking bay 20 can in particular be understood as an area in which contiguous parking is possible. In other words, this is an uninterrupted area in which parking spaces 24 are located. Another term for this would be parking lot.

With its sensor direction 13, the LIDAR sensor 12 is aligned laterally to the curbside, ideally in a substantially orthogonal manner to the direction of travel of the vehicle 10.

The vehicle 10 is moved on a street 21 along the parking bay 20. The parking bay 20 illustrated here is partially occupied. In the parking bay 20 three vehicles 23 as well as one vacant parking space 24 are located.

As the vehicle 10 travels past the parking bay 20, what is ascertained by means of the LIDAR sensor 12 and the GPS sensor 14 are on the one hand distance data concerning the distance between the LIDAR sensor 12 and the next object, for instance the vehicle 23 or a house wall situated behind, and at the same time corresponding location data in order to localize the measurement. Synchronization can in this case be implemented by way of a joint time stamp, for example.

Figure 2:
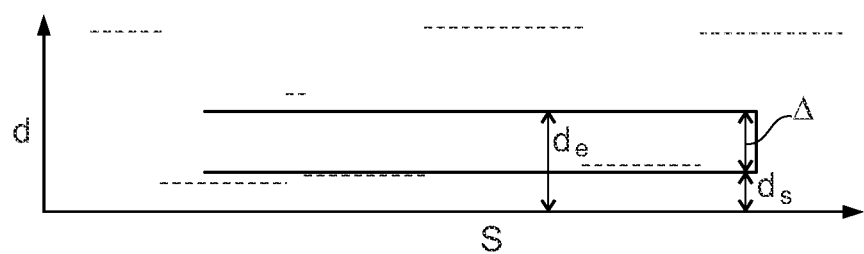
FIG. 2 is a schematic illustration of the ascertained distance data.

In FIG. 2 the distance data d ascertained by means of the LIDAR sensor 12 are illustrated along the street segment. It can be seen that different distances d are on hand for different positions s. On the basis of these different distances d, ascertainment is now made by way of the method according to the invention if a vacant parking space is present or not.

However, before this evaluation can be carried out, projected distance data that are distributed equidistantly, e.g., in 5 cm steps, along the parking bay 20 are produced from the data ascertained by means of the LIDAR sensor 12 and the GPS sensor 14. To this end, it is partly necessary to take the mean of the corresponding data or rather project these to an ideal line along the parking bay. For this purpose, it may be helpful if data on the course of the street are on hand. This step is advantageous to increase accuracy but is not absolutely necessary.

Figure 3:
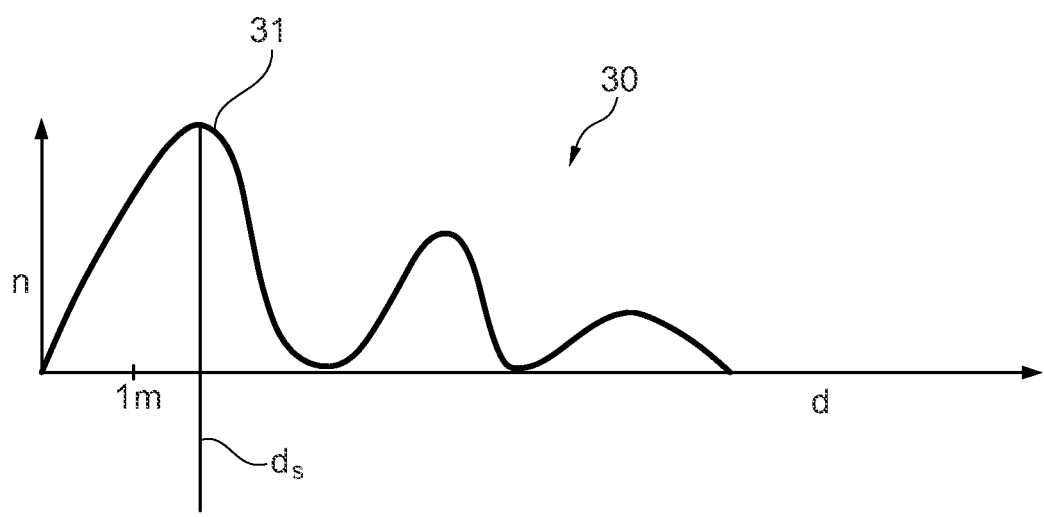
FIG. 3 is a distance histogram of the ascertained distance data.

Finally, data are present in a form as shown in FIG. 2. In order to ascertain in the next step if each point or each position along the parking bay is occupied or unoccupied, the standard distance $d_s$ is initially ascertained in accordance with the invention. This is a value that provides information on the average distance between the vehicle 10 passing by and parked vehicles 23 in the parking bay 20. This can be implemented in several ways. According to the invention this can, for example, be implemented as set out in the following with reference to FIG. 3. FIG. 3 depicts a distance histogram 30 of the projected distance values along the parking bay 20. In the histogram 30 the number of measurements n with a certain distance d is shown. According to the invention, the standard distance $d_s$ is, for example, set to the value of the first maximum that has a distance of at least 1 m. This can be additionally refined in that the further requirement is that this maximum has a minimum size compared to other existing maxima or also a minimum surface. Within the meaning of the invention the minimum surface can be ascertained, for example, by dividing the histogram into individual subareas that each have a width of 20 cm for example, i.e., from 0 to 20 cm, from 20 to 40 cm and so on. For a maximum used to define the standard distance $d_s$, the surface present below the curve of the histogram 30 then has to have a corresponding minimum value that, for example, amounts to 10% of the entire surface of the distance histogram.

The standard distance $d_s$ ascertained accordingly is drawn in FIG. 2. Next, the delta $\Delta$ is ascertained in accordance with the invention. This depends on the parking orientation within the parking bay 20. By way of the delta $\Delta$, it is taken into account whether parking in the parking bay is, e.g., parallel, orthogonal or diagonal to the course of the street. The parking orientation is ascertained from the existing static parking information on the respective parking bay. In the European region, for example, values of 3 meters for parallel parking orientation, 4 meters for orthogonal parking orientation and 3.5 meters for diagonal parking orientation can be used. In North America, where most parking spaces are considerably larger, correspondingly higher values are assumed.

Subsequently, a rating distance $d_e$ is ascertained by adding the standard distance $d_s$ and the corresponding delta $\Delta$.

$$d_e = d_s + \Delta$$

For each point along the parking bay 20 a comparison is now made as to whether the projected distance value d is greater or smaller than $d_e$. If this is greater than $d_e$, then this point is determined as unoccupied. If, however, it is smaller or equal to $d_e$, then it is ascertained as occupied.

In order to subsequently ascertain from this information if a parking space is vacant or a parking bay is occupied, an additional evaluation has to be carried out. This is now explained in greater detail with reference to FIG. 4.

To find a vacant parking space 24, according to the invention the length of adjoining points detected as being vacant is set in relation to the average length of a parking space and the result is rounded down.

The average length of a parking space also results from the static parking information on a parking bay 20, as it must also be taken into account here in which orientation parking is allowed in this parking bay. For parallel parking in Europe, for example, a length of 5.5 meters, for orthogonal parking a length of 2.5 meters and for diagonal parking a length of 3 meters is assumed.

Figure 4:
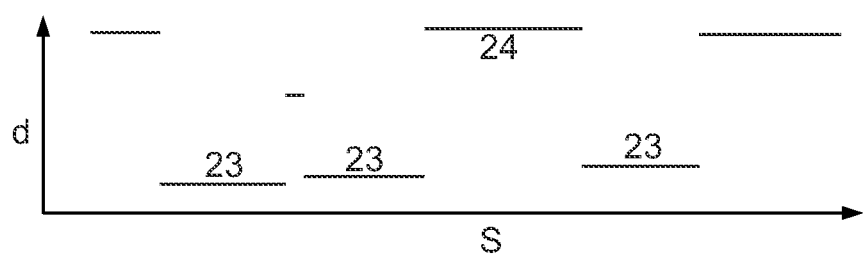
FIG. 4 is a schematic illustration following evaluation of the data.

According to the result of this evaluation it can thus be ascertained, as illustrated in FIG. 4, where a vehicle 23 is parked in the parking bay 20 and which spaces in the parking bay 20 can be detected as vacant parking spaces 24.

By way of the method according to the invention it is thus possible to easily produce highly accurate information on the parking state of parking spaces.

The invention claimed is:

1. A method for determining an occupancy status of a parking bay, wherein a vehicle is moved along a street segment with at least one parking bay, the method comprising:

wherein the vehicle has a distance sensor configured to generate distance data, and being aligned laterally to a curbside, and a sensor for satellite-based location and time determination, by means of which distance and location data are recorded during movement of the vehicle along the street segment, wherein the distance data of the distance sensor represent the distance from the distance sensor to a next object along a sensor direction of movement of the distance sensor, wherein static parking information data on positions of parking bays in the street segment and parking information on each said parking bay are on hand, using the distance and location data to ascertain projected distance data arranged along the parking bay, which each indicate a distance datum of the distance sensor to the next object in the sensor direction at a point on the street of the street segment at the parking bay, wherein the projected distance data take into account a course of the street segment by projecting the location data on the course of the street segment and adjusting the distance data accordingly, using the projected distance data of the parking bay to ascertain a standard distance $d_s$, and in that a point of a parking bay is determined as unoccupied if the distance datum of this point is greater than the standard distance plus a delta $\Delta$, in that an area of a parking bay is determined as one or several vacant parking spaces if a rounded-down quotient of a length of adjoining contiguous unoccupied points to a length of an average parking space is 1 or greater.

2. The method according to claim 1, wherein the projected distance data are ascertained equidistantly along the parking bay.

3. The method according to claim 1, wherein data on the course of the street segment are on hand which are used to produce the projected distance data.

4. The method according to claim 1, wherein missing distance and/or location data are interpolated for the projected distance data.

5. The method according to claim 1, further comprising:
to ascertain the standard distance $d_s$, a distance histogram of the projected distance data of the parking bay is used.

6. The method according to claim 5, wherein as the standard distance $d_s$, a first maximum of the distance histogram is used which has a distance of at least 1 meter.

7. The method according to claim 5 wherein as the standard distance $d_s$, a first maximum of the distance histogram is used which amounts to at least 10% of a highest maximum.

8. The method according claim 5, wherein as the standard distance $d_s$, a first maximum of the distance histogram is used which has at least 10% of a surface of the distance histogram.

9. The method according to claim 5, wherein as the standard distance $d_s$, 5 meters is set when no distinct standard distance $d_s$ can be ascertained by means of the projected distance data.

10. The method according to claim 5, wherein a length of an average parking space of a parking bay is present in the static parking information data.

11. The method according to claim 5, wherein as the standard distance $d_s$, a first maximum of the distance histogram is used.

12. The method according to claim 1, wherein the delta $\Delta$ is determined by way of the static parking information data of the parking bay.

13. The method according to claim 1, wherein as the distance sensor, a LIDAR sensor is used.

14. The method according to claim 1, as the distance sensor a 1-D LIDAR sensor is used.

15. The method according to claim 1,
further comprising:
forwarding the distance and location data to a remotely arranged computer unit,
in that a storage is provided, in which the static parking information data is present and
using the computer unit to calculate the projected distance data, the standard distance $d_s$ and the determination of a parking state of the parking bay.

16. The method according to claim 1, wherein the method is carried out separately for each one of a plurality of parking bays present along the street segment.

* * * * *

UNITED STATES PATENT AND TRADEMARK OFFICE
CERTIFICATE OF CORRECTION

PATENT NO. : 11,568,745 B2
APPLICATION NO. : 17/322152
DATED : January 31, 2023
INVENTOR(S) : Christoph Fretter et al.

It is certified that error appears in the above-identified patent and that said Letters Patent is hereby corrected as shown below:

In the Claims

Column 10, Line 5 In Claim 8, after "according", insert --to--

Column 10, Line 30 In Claim 15, after "present", insert --,--

Signed and Sealed this
Eleventh Day of April, 2023

Katherine Kelly Vidal
*Director of the United States Patent and Trademark Office*